(No Model.)
T. H. LOVEJOY.
STREET CAR TRUCK.
No. 571,091.  Patented Nov. 10, 1896.
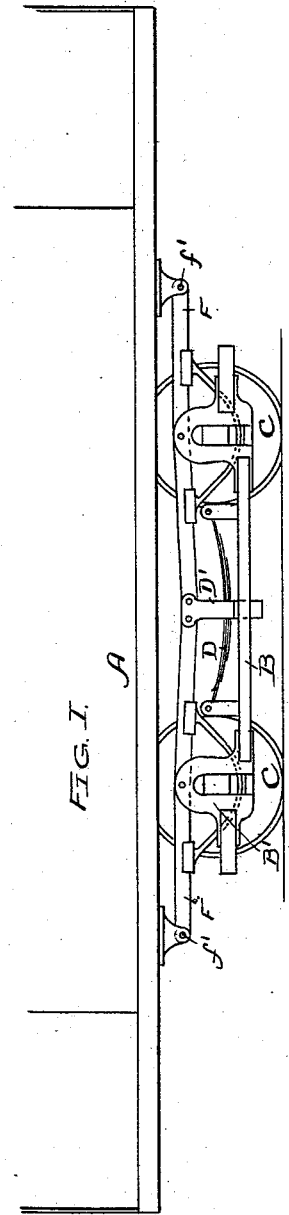
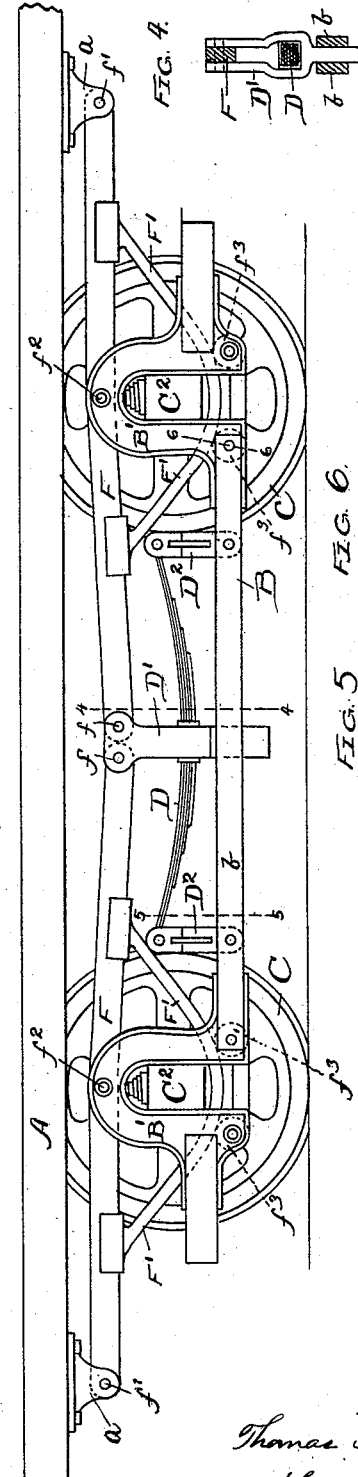
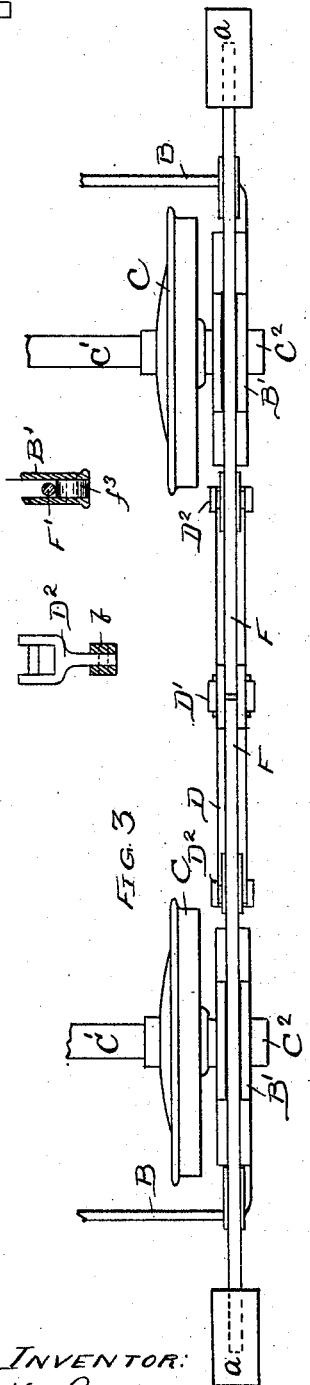
WITNESSES:
Geo. E. Curtis
H. W. Munday
INVENTOR:
Thomas H. Lovejoy
BY Munday, Evarts & Adcock
HIS ATTORNEYS.
THE NORRIS PETERS CO., PHOTO-LITHO., WASHINGTON, D. C.

UNITED STATES PATENT OFFICE.

THOMAS H. LOVEJOY, OF CHICAGO, ILLINOIS.

STREET-CAR TRUCK.

SPECIFICATION forming part of Letters Patent No. 571,091, dated November 10, 1896.

Application filed March 20, 1896. Serial No. 584,189. (No model.)

*To all whom it may concern:*

Be it known that I, THOMAS H. LOVEJOY, a citizen of the United States, residing in Chicago, in the county of Cook and State of Illinois, have invented a new and useful Improvement in Street-Car Trucks, of which the following is a specification.

My invention relates to improvements in street-cars and more particularly to those which are mounted upon a single truck.

Heretofore considerable difficulty has been experienced in the practical operation of single-truck street-cars, and especially in electric cars that are run rapidly, from the tendency of the car-body to teeter or rock up and down on the truck as a pivot, the oscillation frequently becoming so violent as to endanger the passengers standing on the front and rear platforms, and to render it necessary to stop the car or slacken the speed until the oscillation subsides. This is due to the fact that the car-body is much longer than the truck, the truck being made usually about seven feet from center to center of the wheels, while the car-body, including the front and rear platforms, is ordinarily twenty-four to twenty-six feet in length, so that any jolt or unevenness in the track is liable to set the car into oscillation about the truck of one of its axles as a center, and this tendency is increased owing to the fact that the load is seldom equally distributed throughout the length of the car-body, it frequently happening that the car-body is nearly equally balanced over one or the other of the two axles of the truck as a center, by reason of a greater number of passengers being at one end than at the other.

The object of my invention is to overcome this difficulty and at the same time provide a better, simpler, stronger, more efficient, and more durable construction of street-car truck than those heretofore in use.

To this end my invention consists, essentially, in connection with a street-car body and its single centrally-located short truck, of a pair of equalizers or pivoted levers interposed between the car-body, the truck, and the spring or springs. The equalizers are each preferably fulcrumed on the truck-frame near one end thereof, and each preferably pivotally connected to the car-body at its outer end and to the hanger or seat for the spring at the inner or adjacent ends of the two equalizers. By this means, as will be readily understood from the drawings, when the wheel, or wheels, at either end of the truck runs, for example, into a depression in the track, and that end of the car-body drops down and the jolt causes the spring to be compressed, the two equalizers will turn on their pivots or fulcrums simultaneously, so that both ends of the car-body will move down and up substantially in unison, thus preventing the teetering or tilting of the car-body on the truck. In other words, when the spring is compressed by a jolt or obstruction at either end of the truck the two equalizers turning on their pivots will necessarily cause both ends of the car-body to be similarly affected, both ends rising or both ends falling, and thus preventing tilting or teetering.

In the accompanying drawings, which form a part of this specification, and in which similar letters of reference indicate like parts throughout all the views, Figure 1 is a side elevation of a device embodying my invention. Fig. 2 is an enlarged side elevation of the truck. Fig. 3 is a plan view of one side of the truck. Figs. 4, 5, and 6 are cross-sections on lines 4 4, 5 5, and 6 6, respectively, of Fig. 2.

In the drawings, A represents a street-car body, only a portion of it being shown, B is the truck-frame having the customary pedestals B', C the wheels, C' the axles, and $C^2$ the journal-boxes, all of these parts being of any suitable or known construction.

D is the spring, one or more on each side of the truck, which cushions the shocks between the car-body and the truck, and D' its movable hanger or seat.

F F are the two equalizers or levers connecting the car-body A, truck-frame B, and spring D, the two adjacent or inner ends of the equalizers being pivoted at $f$, preferably both to the same spring-seat or hanger D', and at their outer ends by pins $f'$ $f'$ to the car-body or to suitable brackets $a$ $a$, attached thereto, and at or near their middle to the pedestals B' B' of the truck-frame by pins or bolts $f^2$ $f^2$ or other suitable means which permit these equalizers to turn thereon as a fulcrum.

The spring D is preferably a flat or leaf spring, the hanger D' bearing against its middle, and its two ends bearing against hangers D² D², which are pivoted to the lower side bar b of the truck-frame. The movable hanger D' works up and down in a suitable socket or guide formed in the lower side bar b of the truck-frame.

The equalizers or levers F F, I preferably strengthen by curved braces F' F', bolted or otherwise secured thereto at their ends, and which bear or ride at their middle curved portion against rollers $f^3 f^3$, journaled upon the truck-frame at either side of the axle. The natural looseness of the several pivots $f f' f^2$ of the equalizers F will permit them to turn freely to the small extent required on their fulcrums $f^2 f^2$ notwithstanding the fact that their inner ends are pivoted to the same hanger D'.

In operation as the spring is compressed by a jolt or obstruction against one wheel of the truck the equalizers move together and thus cause both ends of the car-body to move up and down together without any teetering or tilting action.

It will be understood by those skilled in the art that the construction is the same on both sides of the truck, the equalizers F F and the spring D being duplicates on both sides.

I claim—

1. In a street-car, the combination with the car-body, truck and spring, of a pair of equalizers or pivoted levers connecting the car-body, spring and truck-frame, said spring being between the said equalizers or levers and said truck-frame, and opposing hangers bearing against said spring and connected to the inner ends of said equalizers or levers and to the truck-frame respectively, whereby both ends of the car-body are caused to move up and down together and teetering or tilting of the car-body on the truck prevented, substantially as specified.

2. In a street-car, the combination with the car-body, truck and spring, opposing hangers or seats bearing against said spring, one of the same being movable, of a pair of equalizers fulcrumed near their middle on the truck-frame, pivotally connected at their two outer ends to the car-body, and at their inner or adjacent ends to said movable hanger or seat for the spring, said spring being between said equalizers and truck-frame substantially as specified.

3. The combination with a car-body, of a pair of equalizers F F upon the outer ends of which the car-body rests, a truck-frame upon which the equalizers are fulcrumed, and a spring and its movable hanger to which the equalizers are pivotally connected at their inner or adjacent ends, said spring being a flat or leaf spring, and the truck-frame having hangers or bearings acting against the ends of said spring, substantially as specified.

4. The combination with a car-body, of a pair of equalizers F F upon the outer ends of which the car-body rests, a truck-frame upon which the equalizers are fulcrumed, and a spring and its movable hanger to which the equalizers are pivotally connected at their inner or adjacent ends, said equalizers being provided with curved braces, and said truck-frame being provided with rollers against which the curved portion of said braces rest or ride, substantially as specified.

5. The combination with a car-truck frame B, having pedestals B' B', of equalizers F F fulcrumed upon said pedestals, a spring D and a movable hanger or seat D' for the spring to bear against connected to said equalizers, said spring being a flat or leaf spring and said truck-frame having hangers D² D² to bear against the ends of the spring, substantially as specified.

6. The combination with a car-truck frame B, having pedestals B' B', of equalizers F F fulcrumed upon said pedestals, a spring D and a movable hanger or seat D' for the spring to bear against connected to said equalizers, said equalizers having each a curved brace F' F', and said truck-frame being provided with rollers $f^3 f^3$ to bear against the curved portion of said brace, substantially as specified.

THOMAS H. LOVEJOY.

Witnesses:
H. M. MUNDAY,
S. E. CURTIS.